(12) United States Patent
Andrews et al.

(10) Patent No.: US 6,309,521 B1
(45) Date of Patent: Oct. 30, 2001

(54) ELECTROLYZER

(75) Inventors: Craig C. Andrews, College Station; Oliver J. Murphy, Bryan, both of TX (US)

(73) Assignee: Lynntech Internationals, Inc., College Station, TX (US)

( * ) Notice: Subject to any disclaimer, the term of this patent is extended or adjusted under 35 U.S.C. 154(b) by 0 days.

(21) Appl. No.: 09/568,680

(22) Filed: May 11, 2000

Related U.S. Application Data (63) Continuation of application No. 08/821,419, filed on Mar. 21, 1997.

(51) Int. Cl.[7] .............. C25B 9/00; C25B 11/03; C25B 11/04; C25B 11/12
(52) U.S. Cl. .......... 204/252; 204/255; 204/256; 204/258; 204/262; 204/263; 204/283; 204/292; 204/293; 204/294
(58) Field of Search ................ 204/254–256, 204/257–258, 283, 262, 252, 263, 292–294

(56) References Cited

U.S. PATENT DOCUMENTS

| | | | |
|---|---|---|---|
| 4,654,136 | * | 3/1987 | Dang et al. .................. 204/283 |
| 4,655,887 | * | 4/1987 | Oda et al. .................. 204/283 X |
| 4,859,376 | * | 8/1989 | Hancock et al. .................. 261/35 |
| 4,950,371 | * | 8/1990 | McElroy .................. 204/266 X |
| 5,427,658 | * | 6/1995 | Allen .................. 204/266 X |
| 5,460,705 | * | 10/1995 | Murphy et al. .................. 204/252 |
| 5,529,683 | * | 6/1996 | Critz et al. .................. 205/350 |
| 5,686,051 | * | 11/1997 | Shiota et al. .................. 422/186.14 |

\* cited by examiner

*Primary Examiner*—Donald R. Valentine
(74) *Attorney, Agent, or Firm*—Streets & Steele; Jeffrey L. Streets (57) ABSTRACT

An ozone generator which operates at constant pressures to produce a continuous flow of ozone in an oxygen stream having from 10% to 18% by weight of ozone. The ozone generator includes one or more electrolytic cells comprising an anode/anode flowfield, a cathode/cathode flowfield, and a proton exchange medium for maintaining the separation of ozone and oxygen from hydrogen. The ozone generator also has an anode reservoir which vents oxygen and ozone and a cathode reservoir which vents hydrogen. The anode reservoir can be filled from the cathode reservoir while continuing to produce ozone. The ozone generator is readily configured for self-control using a system controller programmed to operate the anode reservoir at a constant pressure.

27 Claims, 4 Drawing Sheets

ELECTROLYZER

This is a continuation of copending application(s) Ser. No. 08/821,419 filed on Mar. 21, 1997.

This invention was made with government support under contract F41624-96-C-2001 awarded by the Air Force. The government has certain rights in this invention.

BACKGROUND OF THE INVENTION

1. Field of the invention

This invention relates to the production of ozone for use in a variety of processes such as decontamination of water. More specifically, the invention relates to an electrochemical cell and a process for generating ozone in the electrochemical cell.

2. Background of the Related Art

Ozone has long been recognized as a useful chemical commodity valued particularly for its outstanding oxidative activity. Because of this activity, it finds wide application in disinfection processes. In fact, it kills bacteria more rapidly than chlorine, it decomposes organic molecules, and removes coloration in aqueous systems. Ozonation removes cyanides, phenols, iron, manganese, and detergents. It controls slime formation in aqueous systems, yet maintains a high oxygen content in the system. Unlike chlorination, which may leave undesirable chlorinated organic residues in organic containing systems, ozonation leaves fewer potentially harmfull residues. Ozone has also been shown to be useful in both gas and aqueous phase oxidation reactions which may be carried out by advanced oxidation processes (AOPs) in which the formation of OH• radicals is enhanced by exposure to ultraviolet light. Certain AOPs may even involve a catalyst surface, such as a porous titanium dioxide photocatalyst, that further enhances the oxidation reaction. There is even evidence that ozone will destroy viruses. Consequently, it is used for sterilization in the brewing industry and for odor control in sewage treatment and manufacturing. Ozone may also be employed as a raw material in the manufacture of certain organic compounds, e.g., oleic acid and peroxyacetic acid.

Thus, ozone has widespread application in many diverse activities, and its use would undoubtedly expand if its cost of production could be reduced. In addition, since ozone is explosive when concentrated as either a gas or liquid, or when dissolved into solvents or absorbed into cells, its transportation is potentially hazardous. Therefore, its is generally manufactured on the site where it is used. However, the cost of generating equipment, and poor energy efficiency of production has deterred its use in many applications and in many locations.

On a commercial basis, ozone is currently produced by the silent electric discharge process, otherwise known as corona discharge, wherein air or oxygen is passed through an intense, high frequency alternating current electric field. The corona discharge process forms ozone through the following reaction:

Yields in the corona discharge process generally are in the vicinity of 2% ozone, i.e., the exit gas may be about 2% $O_3$ by weight. Such $O_3$ concentrations, while quite poor, in an absolute sense, are still sufficiently high to furnish usable quantities of $O_3$ for the indicated commercial purposes. Another disadvantage of the corona process is the production of harmful $NO_x$ otherwise known as nitrogen oxides.

Other than the aforementioned electric discharge process, there is no other commercially exploited process for producing large quantities of $O_3$.

However $O_3$ may also be produced by the electrolytic process, wherein an electric current (normally D.C.) is impressed across electrodes immersed in an electrolyte, i.e., electrically conducting, fluid. The electrolyte includes water, which, in the process dissociates into its respective elemental species, $O_2$ and $H_2$. Under the proper conditions, the oxygen is also evolved as the $O_3$ species. The evolution of $O_3$ may be represented as:

It will be noted that the $\Delta H°$ in the electrolytic process is many times greater than that for the electric discharge process. Thus, the electrolytic process appears to be at about a six-fold disadvantage.

More specifically, to compete on an energy cost basis with the electric discharge method, an electrolytic process must yield at least a six-fold increase in ozone. Heretofore, the necessary high yields have not been realized in any forseeably practical electrolytic system.

The evolution of $O_3$ by electrolysis of various electrolytes has been known for well over 100 years. High yields up to 35% current efficiency have been noted in the literature. Current efficiency is a measure of ozone production relative to oxygen production for given inputs of electrical current, i.e., 35% current efficiency means that under the conditions stated, the $O_2/O_3$ gases evolved at the anode are comprised of 35% $O_3$ by volume. However, such yields could only be achieved utilizing very low electrolyte temperatures, e.g., in the range from about −30°C. to about −65°. Maintaining the necessary low temperatures, obviously requires costly refrigeration equipment as well as the attendant additional energy cost of operation.

Ozone, $O_3$, is present in large quantities in the upper atmosphere in the earth to protect the earth from the suns harmful ultraviolet rays. In addition, ozone has been used in various chemical processes, is known to be a strong oxidant, having an oxidation potential of 2.07 volts. This potential makes it the fourth strongest oxidizing chemical known.

Because ozone has such a strong oxidation potential, it has a very short half-life. For example, ozone which has been solubilized in waste water may decompose in a matter of 20 minutes. Ozone can decompose into secondary oxidants such as highly reactive hydroxyl (OH•) and peroxyl ($HO_2$ •) radicals. These radicals are among the most reactive oxidizing species known. They undergo fast, non-selective, free radical reactions with dissolved compounds. Hydroxyl radicals have an oxidation potential of 2.8 volts (V), which is higher than most chemical oxidizing species including $O_3$. Most of the OH• radicals are produced in chain reactions where OH• itself or $HO_2$ • act as initiators.

Hydroxyl radicals act on organic contaminants either by hydrogen abstraction or by hydrogen addition to a double bond, the resulting radicals disproportionate or combine with each other forming many types of intermediates which react further to produce peroxides, aldehydes and hydrogen peroxide.

Electrochemical cells in which a chemical reaction is forced by added electrical energy are called electrolytic cells. Central to the operation of any cell is the occurrence of oxidation and reduction reactions which produce or consume electrons. These reactions take place at electrode/ solution interfaces, where the electrodes must be good electronic conductors. In operation, a cell is connected to an external load or to an external voltage source, and electric charge is transferred by electrons between the anode and the cathode through the external circuit. To complete the electric circuit through the cell, an additional mechanism must exist for internal charge transfer. This is provided by one or more electrolytes, which support charge transfer by ionic conduction. Electrolytes must be poor electronic conductors to prevent internal short circuiting of the cell.

The simplest electrochemical cell consists of at least two electrodes and one or more electrolytes. The electrode at which the electron producing oxidation reaction occurs is the anode. The electrode at which an electron consuming reduction reaction occurs is called the cathode. The direction of the electron flow in the external circuit is always from anode to cathode.

Recent ozone research has been focused primarily on methods of using ozone, as discussed above, or methods of increasing the efficiency of ozone generation. For example, research in the electrochemical production of ozone has resulted in improved catalysts, membrane and electrode assemblies, flowfields and bipolar plates and the like. These efforts have been instrumental in making the electrochemical production of ozone a reliable and economical technology that is ready to be taken out of the laboratory and placed into commercial applications.

However, because ozone gas has a very short life, it is preferably generated in close proximity to where the ozone will be consumed and at a rate substantially equal to the rate of consumption. Because so many of the present applications for ozone deal with the oxidation of contaminants in water streams, air streams and soil, it is typically impractical to bring the contaminant to a centralized ozone processing plant. Rather, it is imperative that the ozone be generated at the site of the contamination. This may be an active or abandoned industrial site or a remote location where little or no utilities are available. Furthermore, the rate of ozone consumption will vary according to the type of decontamination process and the nature of the site itself Unfortunately, there has been very little attention given to the development of self-contained and self-controlled support systems and utilities for ozone producing electrochemical cells. In order for these systems to be commercially successful, the systems must be reliable, require low maintenance, operate efficiently and be able to operate on standard utilities, such as 110 V, 60 Hz AC electricity provided by a standard gasoline powered generator. Furthermore, these objectives must be met while providing a simple system that can be used to decontaminate a site in a cost-effective manner.

Therefore, there is a need for an ozone generator system that operates efficiently on standard AC electricity and water to deliver a steady and reliable stream of ozone gas. It would be desirable if the system was self-contained, self-controlled and required very little maintenance. It would be further desirable if the system could provide a continuous supply of ozone at a rate dependent upon demand.

SUMMARY OF THE INVENTION

The present invention provides an ozone generating system that includes one or more electrolytic cells comprising an anode flowfield and a cathode flowfield. The system also includes an anode reservoir in fluid communication with the anode flowfield, the anode reservoir comprising a gas discharge valve; and a cathode reservoir in fluid communication with the cathode flowfield, the cathode reservoir comprising a gas discharge valve. The anode and cathode reservoirs may comprise a water inlet port. The anode reservoir preferably comprises a water cooling member in thermal communication with the anode reservoir and a water recirculating member. The anode reservoir may comprise a stand pipe having a small hole for equalizing water levels in the stand pipe and the anode reservoir. The anode reservoir may be in fluid communication through a control valve to the cathode reservoir. The system may further comprise a pump having an inlet in fluid communication with the anode reservoir and an outlet in fluid communication with the anode. The anode reservoir is preferably elevated above the anode flowfield and the anode reservoir inlet preferably communicates with the top of the anode flowfield. A system controller may be included in the system and be programmed to operate the anode reservoir gas discharge valve based on the water level in the anode reservoir. The system controller may also be programmed to operate a cathode reservoir gas discharge valve based on the water level in the cathode reservoir.

In another aspect of the invention, a process for generating ozone is provided comprising the steps of: electrolyzing water in one or more electrolytic cells comprising an anode flowfield and a cathode flowfield which separate ozone and oxygen from hydrogen; recirculating water between the anode flowfield and an anode reservoir; separating ozone and oxygen from water in the anode reservoir; discharging oxygen and ozone from the anode reservoir; receiving water from the cathode flowfield in a cathode reservoir; separating hydrogen from water in the cathode reservoir; discharging hydrogen from the cathode reservoir; and adding water to each reservoir as needed to maintain continuous production of ozone. The process may also include cooling water in the anode reservoir. It is preferred that water from the anode flowfield be recirculated to the anode reservoir through a stand pipe in the anode reservoir. A preferred stand pipe has a small hole at its base for equalizing water levels. Water can be added to the anode reservoir from the cathode reservoir. The anode reservoir and cathode reservoir may be operated at the same or different pressures and be maintained at separate setpoint pressures and a substantially constant water level. Most preferably, the anode reservoir operates at lower pressure than the cathode reservoir, such as about 30 psig and about 40 psig, respectively. A gas stream comprising between about 10% and about 18% by weight of ozone is discharged from the anode reservoir.

The ozone generator may comprise: one or more electrolytic cells comprising an anode and cathode; a power supply electronically coupled to the electrolytic cells; an anode reservoir in fluid communication with the anode, the anode reservoir comprising a gas releasing member; a recirculating member in fluid communication between the anode reservoir and the anode; a cathode reservoir in fluid communication with the cathode; a system controller in electronic communication with the power supply, the recirculating member, and the anode gas releasing member; and a memory device coupled to the system controller, the memory device comprising a readable program code for selecting a process comprising the steps of electrolyzing water in the electrolytic cells, recirculating water between the anode cell and the anode reservoir, separating ozone and oxygen from water in the anode reservoir, discharging oxygen and ozone from the anode reservoir, receiving water from the cathode cell in the cathode reservoir, and adding water from the cathode reservoir to the anode reservoir as needed to maintain continuous production of ozone. The ozone generator may further comprise a cooling member disposed in thermal communication with the water in the anode reservoir and/or a battery backup in electronic communication with the electrolytic cells.

BRIEF DESCRIPTION OF THE DRAWINGS

So that the above recited features and advantages of the present invention can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

The present invention provides an ozone generator useful for supplying ozone to many industrial processes such as the photocatalytic oxidation of organic compounds in a nonorganic solvent such as groundwater. The ozone generator includes one or more electrolytic cells comprising an anode, a cathode and a proton exchange membrane (PEM) disposed between the anode and cathode. The PEM is not only proton conducting, but also electronically insulating and gas impermeable to maintain separation of ozone and oxygen gases generated at the anode from hydrogen or other gases generated at the cathode. The ozone generator also comprises an anode reservoir having a gas discharge valve for venting oxygen and ozone, a recirculating member for recirculating water between the anode reservoir and the anode flowfield, and, optionally, a cooling member for cooling water in the anode reservoir. The ozone generator further comprises a cathode reservoir having a gas discharge valve for venting gases produced at the cathode. While both reservoirs may have a separate water filling port, it is preferred that the reservoirs communicate through an isolation valve so that the anode reservoir can be filled from the cathode reservoir while continuing to produce ozone. The ozone generator is readily configured for self-control using a system controller programmed to generate ozone while operating the anode reservoir and the cathode reservoir at constant pressures.

The ozone source preferably generates a gas stream comprising from about 10% to about 18% by weight of ozone in oxygen. Such electrolytic cells, including depolarizing electrolytic cells, are described in U.S. Pat. No. 5,460,705 which description is incorporated by reference herein. A fully self-controlled electrolytic cell for producing ozone is most preferred for use at remote locations such as a groundwater treatment facility.

In one aspect of the present invention, the anode reservoir comprises a cooling member which cools the water in the reservoir. Since the cooled water is recirculated to the anode compartment, the electrolytic cell is maintained at a temperature below about 30°C., where the cell operates most efficiently. Without the cooling member, the electrical resistances in the electrolytic cell generate heat that increases the temperature of the cell and effects the cell operation.

In another aspect of the present invention, a battery backup system is provided to maintain a potential across the cells during periods of power loss or idle operation. A preferred battery backup system includes a battery connected to the electrolyzer in parallel with the main power supply through a forward biased diode to provide backup power without interruption of signal processing. Maintaining a potential across an electrolytic cell has been found to increase the life of the lead dioxide electrocatalyst, which experiences an irreversible decrease in ozone production capacity following a complete loss of electrical potential.

In yet another aspect of the present invention, the ozone generator is provided with an ozone destruction unit or "ozone destruct". The ozone destruct is disposed in communication with the ozone discharge of the anode reservoir. The amount of ozone that is produced and separated, but not used by some ozone consuming process, is catalytically destroyed on contact. The ozone destruct comprises a catalyst, such as $Fe_2O_3$, $MnO_2$ or a noble metal (e.g., platinum and palladium), most preferably $MnO_2$ or platinum.

Another aspect of the invention provides a simplified anode reservoir in which the ozone control valve and level sensor are eliminated. The simplified anode reservoir comprises a membrane that selectively allows the passage of ozone and oxygen gas while retaining water. The membrane is preferably a porous polytetrafluoroethylene (PTFE) membrane, available from W. L. Gore & Associates, Inc., Elkton, Md. under the trade name GORETEX®. The simplified anode reservoir also allows eliminates the need for a shut off valve in the tubing that connects the anode and cathode reservoirs. Without the shut off valve, water from the cathode reservoir flows freely to the anode reservoir to keep the anode reservoir full of water.

Yet another aspect of the present invention provides an electrolytic cell that efficiently produces ozone. The electrolytic cell uses a proton exchange membrane (PEM), such as a perfluorinated sulfonic acid polymer sheet, in intimate contact between the anode and cathode catalysts. The anode and cathode catalysts are also in intimate contact with an anode flowfield and a cathode flowfield, respectively. The flowfields make electrical contact with either a bipolar plate disposed between each cell or a current collector plate at the two ends of the cell stack. The anode flowfield is preferably made from a valve metal such as titanium. However, because the valve metals become embrittled from exposure to hydrogen, the cathode flowfield is preferably made from a metal other than the valve metals, such as stainless steel, nickel, copper or combinations thereof.

Another aspect of the invention provides anode and cathode flowfields each comprising a first region adjacent the PEM that is flat, smooth and porous and a second region that is more open and provides a low-resistance flow path therethrough. The first region provides substantially continuous and even support of the membrane and electrocatalysts so that the membrane and electrocatalysts are not damaged when the cell stack is compressed. The preferred anode flowfield has a first region made of porous, sintered titanium and a second region made of rolled, expanded titanium with each sheet rotated 90 degrees from the next sheet. The anode catalyst, such as lead dioxide ($PbO_2$), may be deposited either on the porous, sintered titanium surface of the anode flowfield or the surface of the PEM. The preferred cathode flowfield has a first region made of stainless steel felt or wool and porous stainless steel and a second region made of rolled, expanded stainless steel. Where the second regions are made of expanded metal, it is preferred that at least two sheets of the expanded metal be used and that each of the sheets be turned relative to the previous sheet, most preferably at about 90 degrees. The use of multiple expanded metal sheets substantially eliminates blockages to fluid flow that can occur with a single expanded metal sheet.

Because stainless steel felt can be so easily compressed, a most preferred cathode flowfield comprises stainless steel felt, at least two sheets of rolled expanded stainless steel, and a rigid perforated stainless steel sheet disposed between the felt and the expanded stainless steel. The preferred rigid perforated stainless steel sheet has holes therethrough which are larger than the passages in the felt and smaller than the openings in the expanded stainless steel. The rigid perforated stainless steel sheet provides support for the stainless steel felt and prevents the rolled expanded stainless steel sheet from damaging the stainless steel felt.

Figure 1:
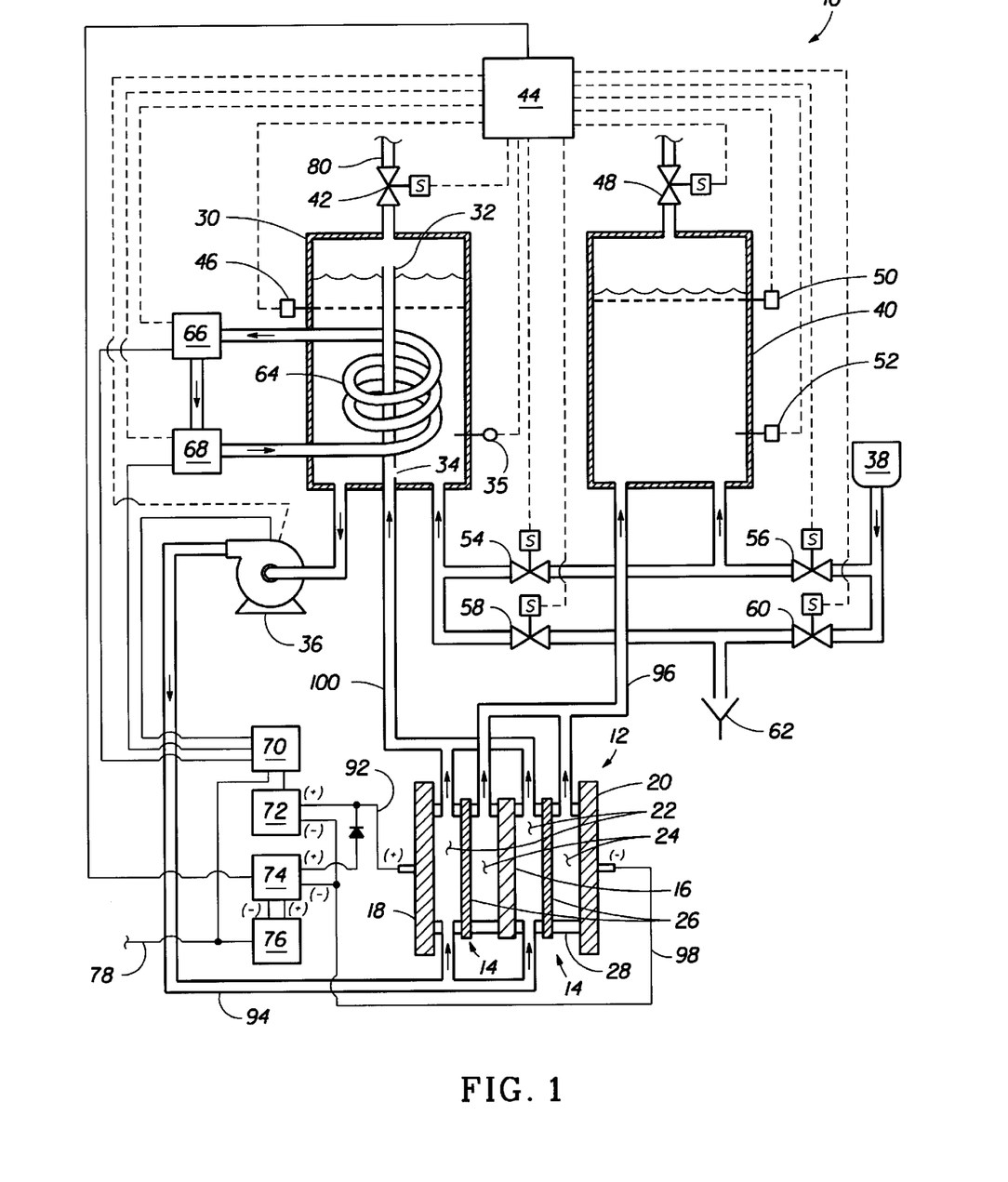
FIG. 1 is a schematic diagram of a self-controlled ozone generator which operates solely on electricity and distilled water.

FIG. 1 is a schematic diagram of a self-controlled ozone generator 10 which operates solely on electricity and distilled water. The heart of the ozone generator 10 is a stack 12 of electrolytic cells (two shown) 14 separated by bipolar plates (one shown) 16 and sandwiched between a positive end plate 18 and a negative end plate 20. Each of the two cells have an anode compartment 22 and a cathode compartment 24 separated by a proton exchange membrane 26. The cells are constructed in a similar manner as those cells described in U.S. Pat. No. 5,460,705, which description is incorporated by reference herein, with the primary difference being that the preferred cathode and anode compartments of the present invention include rolled, expanded metal flowfields and the cathode compartment is filled with water instead of gas. The flow of fluid in and out of the anode and cathode compartments is schematically shown in FIG. 1 as passing through framing members 28 for purposes of simplicity. However, it should be recognized that the fluids actually pass through manifolds formed by adjacent framing members 28, bipolar plates 16, proton exchange membranes 26 and the like which communicate the fluid to openings in the end plates 18, 20.

The anode compartment 22 is provided with water from an anode reservoir 30. The anode reservoir 30 also serves as a liquid/gas separator wherein oxygen and ozone generated in the anode compartment 22 diffuses from the deionized water and collects at the top of the reservoir 30. The reservoir 30 preferably includes a stand pipe 32 which enhances the liquid/gas separation. A preferred stand pipe 32 includes a small hole 34 in its sidewall below the water line, most preferably near the bottom of the anode reservoir 30, which allows the water level in the stand pipe 32 to drop when the ozone generator 10 is in a low flow idle mode, such as when the recirculation pump 36 is turned off, so that gases will continue to rise from the anode compartment 22 through natural means. The small hole 34 does not interfere with flow of the gases up the stand pipe 32 during normal operation.

The water in the anode reservoir 30 is recirculated by a pump 36 back to the anode compartments 22. As water is consumed by the electrochemical reaction which produces oxygen and ozone, water may be added to the anode reservoir from a deionized water source 38 or from the cathode reservoir 40, as will be described in greater detail below. The gases accumulating in the upper portion of the anode reservoir 30, comprising essentially oxygen and ozone, are released through an ozone control valve 42. The ozone control valve 42 controls the flow of gases from the reservoir 30 either mechanically or in accordance with instructions from the system controller 44 which may be programmed in various manners. However, the control valve 42 is preferably opened to maintain a water level above the level sensor 46.

The cathode reservoir 40 holds deionized water which rises from the cathode compartments 24. The cathode reservoir 40 also serves as a liquid/gas separator wherein hydrogen generated in the cathode compartments 24 diffuses from the deionized water and collects at the top of the reservoir 40. A hydrogen control valve 48 controls the flow of gases from the top of the reservoir 40 in co-operation with various system sensors, preferably the high/low liquid level indicators 50, 52.

The anode reservoir 30 and the cathode reservoir 40 are preferably in communication with each other and a source of deionized (DI) water 38. While these components may be communicated in a variety of ways, it is preferred that the system remain simple and include a minimal number of valves and couplings. One preferred configuration is shown in FIG. 1 having tubing that includes a first shut-off valve 54 between the reservoirs 30, 40 and a second shut-off valve 56 between the DI water source 38 and the cathode reservoir 40. It is also preferred to have tubing that provides a drain loop having a third shut-off valve 58 between the anode reservoir 30 and the drain 62 and a fourth shut-off valve 60 between the DI source 38 and the drain 62 for bypassing the first and second shut-off valves for flushing or draining the system.

A cooling member 64 is disposed in a thermal relationship with the water in the anode reservoir 30. Preferably, the cooling member 64 is a cooling coil disposed within the anode reservoir 30 that circulates a cooling fluid through a cooling cycle that includes a condenser 66 and a compressor 68. While only about three windings of the cooling coil 64 are shown, any number of windings may be used.

The ozone generator 10 also includes a main power supply unit 70 and a power converter 72 for converting AC current to DC current for operation of the array of electrolytic cells 12. The main power supply unit 70 preferably provides electrical power to all electrically powered devices in the generator 10 through appropriate electrically conducting wires. The generator 10 preferably includes a battery 74 which is used to backup the main power supply unit 70 during electrical interruptions and to provide smooth DC power to the system controller 44. The battery 74 is preferably continuously charged by a battery charger 76 in order to maintain the battery 74 at a full charge. The main power supply unit 70 and the battery charger 76 are directly connected through electrical line 78 to some external source of AC electrical power, such as a standard household electrical line or a gasoline powered generator for remote use.

The ozone generator 10 is preferably self-controlled by a system controller 44 which receives various signals from sensors and switches and sends control signals to valves, pumps, switches and other devices shown in FIG. 1. The system controller 44 executes system control software stored in a memory. The software is programmed to monitor the various signals indicating the operating conditions of the system and to control various devices in accordance with those conditions. It should be recognized that the programming of the system controller may take on any of a great number of schemes within the scope of the present invention and include additional, non-essential programming, such as system diagnostics, communications, data storage and the like. Further, the system may include additional devices and monitors not shown or described herein, such as an on/off switch.

In operation of the ozone generator 10, the DI water source 38 preferably provides water at a pressure higher than the normal operating range of the anode reservoir 30 and the cathode reservoir 40 so that deionized water can be added to the system during normal operation. Reservoirs 30, 40 are preferably designed to operate in a range between about 0 and about 30 psig, and deionized water is conveniently provided to the system at about 50 psig. During initial start-up of the generator, the valves 54, 56 connecting the reservoirs 30, 40 and the DI water source 38 are open, but the valves 58, 60 leading to a system drain 62 remain closed. Deionized water fills the anode compartments 22 and the cathode compartments 24. Prior to filling the anode reservoir 30 and the cathode reservoir 40, the gas valves 42, 48 are closed to allow the pressure in the system to rise up to about 30 psig. Providing additional DI water into the system raises the level of water in either reservoir 30, 40 to the high level sensors 46, 50 by letting trapped air escape through the gas valves 42, 48 on the reservoirs 30, 40, respectively, to maintain system pressure below about 30 psig. When the reservoirs are filled, the flow of deionized water is stopped by the second shut-off valve 56. Recirculation of water in the anode reservoir 30 by the pump 36 and cooling of the water within the reservoir 30 by the cooling member 64 commences when electric current is applied to the array of electrolytic cells 12. The first shut-off valve 54 will typically remain open so that water carried through the proton exchange membranes 26 from the anode compartments 22 to the cathode compartments 24 can rise into the cathode reservoir 40 and eventually return to the anode reservoir 30.

Initial operation of the ozone generator with the gas valves closed causes oxygen, ozone, and water vapor to accumulate in the anode reservoir 30 and hydrogen and water vapor to accumulate in the cathode reservoir 40 until the system pressure reaches a desired level of about 30 psig. The gas valves 42, 48 are operated by the system controller 44 to maintain the desired system pressure while sending the wet oxygen/ozone gas through line 80 to some ozone consuming process, such as an advanced oxidation process. The wet hydrogen can be collected and used or flared. The ozone generator can continue operation while deionized water is added to the system by temporarily increasing the flow of gases through the gas valves 42, 48 to compensate for added water without raising the system pressure. Alternatively, the system pressure can be reduced prior to adding the deionized water.

Figure 2:
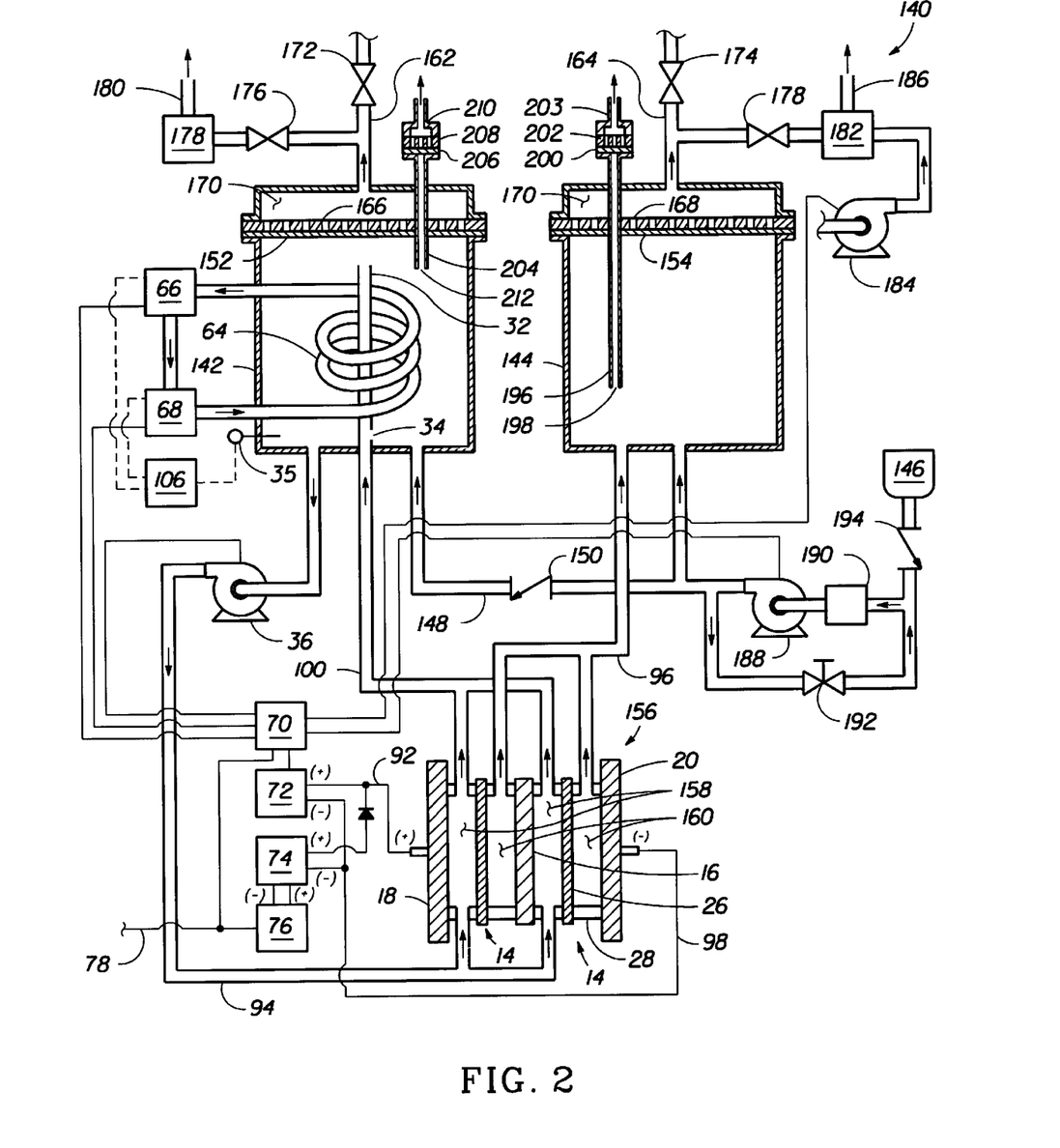
FIG. 2 is a schematic diagram of an alternate ozone generator which operates without a controller, valves or level sensors.

FIG. 2 is a schematic diagram of an alternate ozone generator 140 which operates without a controller, valves or level sensors. The ozone generator 140 operates in a similar manner to the ozone generator 10 of FIG. 1, but has been modified to operate in a completely passive manner without the requirement of a control system, valves, or level sensors. The generator 140 eliminates all solenoid valves 54, 56, 58, 60, 42, 48, all level sensors 46, 50, 52 and the control system 44 that are part of generator 10 of FIG. 1.

The passive generator system 140 provides all water handling requirements and maintains a full water level in the anode reservoir 142 and cathode reservoir 144. These reservoirs 142, 144 are both placed in direct communication with the deionized water source 146. The fluid line 148 between the cathode reservoir 144 and the anode reservoir 142 is small in diameter to provide a sufficiently rapid fluid flow from the cathode reservoir 144 to the anode reservoir 142 so that ozone dissolved in the anode water is not allowed to diffuse into the cathode reservoir 144. A back flow prevention device 150 prevents water or gas flow from the anode reservoir 142 to the cathode reservoir 144.

The gas vent control valves 42 and 48 in FIG. 1 are replaced with hydrophobic membranes or phase separators 152, 154 that prevent the liquid water from escaping out of the tops of the reservoirs 142, 144. These hydrophobic phase separators 152, 154 provide a barrier to water in its liquid state, but allows the free transmission of gases such as water vapor, hydrogen gas, oxygen gas, and ozone gas. The separators 152, 154 allow water from the deionized water source 146 to displace any gases in the reservoirs 142, 144 during initial filling. After all the gases are eliminated from the reservoirs 142, 144 and the water is in direct contact with the hydrophobic membranes 152, 154, then the transfer of water ceases as the pressures in the reservoirs 142, 144 equalize with that of the water source 146. The water in each reservoir 142, 144 continuously remains at this level during all phases of operation.

During normal operation of the ozone generation system 140, gas bubbles are generated in the electrolyzer 156 and then transfer to the water reservoirs. Oxygen and ozone gas bubbles generated in the anode compartments 158 of the electrolyzer 156 are transferred to the anode reservoir 142 and hydrogen gas bubbles generated in the cathode compartments 160 are transferred to the cathode reservoir 144 where the gas bubbles rise to the top surface of their respective reservoirs into contact with the hydrophobic membranes 152, 154. The hydrophobic membranes provide little or no restriction to the transmission of gas and water vapor from inside the reservoirs, at elevated pressure, to the vent lines 162, 164. The separators 152, 154 are suitably supported by support structures 166, 168 which provide free flow of gas and any condensed liquid, but provide sufficient support of the membranes so that pressure differentials between the water in the reservoirs and the gas in the vent lines may possibly exceed about 100 psi. The membrane 152 and the support 166 are in turn provided with mechanical support and liquid and gas sealing by the vessel top 170. The ozone/oxygen vent 162 is in direct communication with the dry side of the membrane 152 allowing the gas previously contained in the bubbles to leave the anode reservoir. Likewise, the hydrogen vent 164 is in direct communication with the dry side of its membrane 154 allowing the hydrogen gas previously entrained in bubbles to leave the cathode reservoir 144.

A pressure regulator 172 may be added to allow the pressure of the oxygen and ozone gas on the dry side of the membrane 152 to reach any value up to the pressure of the liquid within the vessel 142. In a similar manner, a pressure regulator 174 may be added to the hydrogen vent 164 to control the hydrogen delivery pressure. The pressure regulators 172, 174 may be operated independently of each other allowing the gases from the anode reservoir 142 and the cathode reservoir 144 to be regulated individually at gas pressures from sub-ambient up to the pressure of the water which is common to both the anode reservoir 142 and the cathode reservoir 144. Overpressure regulators 176, 178 may be added to prevent overpressurizing the system in the event that the main discharge vents 162, 164 become blocked or surplus gas is produced. Ozone exiting the pressure release valve 176 may be destroyed using a catalytic destruct unit 178 before the gas is released through vent 180 to the atmosphere. Surplus hydrogen, or that resulting from overpressure gas, may be destroyed in a catalytic destruct unit 182 that reacts the hydrogen gas with oxygen from the air provided by an air pump 184. The resulting water vapor and surplus air is released through a vent 186 to the atmosphere. The two destruct units 178, 182 may be placed in thermal communication with each other so the waste heat from the hydrogen/oxygen combination reaction will assist in the destruction of the ozone gas.

An optional boost pump 188 may be added between the deionized water source 146 and the water reservoirs 142, 144. To further condition the water, a resin bed 190 may be added to the water source line. It is preferred to further include a return loop containing flow rate adjusting means 192 in order to continuously polish the incoming water. A back flow prevention device 194 is useful to prevent water from returning to the source 146.

An auxiliary vent system in the cathode reservoir 144 prevents the transfer of hydrogen gas from the cathode reservoir 144 to the anode reservoir 142 in the event of an interruption of the water supply. This is accomplished using a dip tube 196 that extends downward in the cathode reservoir 144 to a point 198 above the bottom of the reservoir which defines the minimum acceptable water level. The dip tube 196 extends upward out of the reservoir and communicates with a hydrophobic membrane 200 with suitable support and housing 202. When the water level is above point 198 and the reservoir is under pressure, water forces any gas in the tube 196 through the hydrophobic membrane 200 and out the vent 203 which is at atmospheric pressure or below. Should the water in the cathode reservoir drop below point 198, the water presently in the tube will drain back out of the tube 196 into the reservoir 144 allowing the gas within the cathode reservoir 144 to escape up the dip tube and out the vent 203. In this manner, the pressure in the reservoir 144 is reduced down to ambient pressure to prevent any further transfer of liquid from the cathode reservoir to the anode reservoir.

The anode reservoir 142 preferably includes a similar auxiliary vent system having a dip tube 204, hydrophobic phase separator 206, housing 208, and vent 210. Through some event, such as pressure fluctuations in the incoming water, if the pressure in the anode reservoir 142 is higher than the pressure in the cathode reservoir 144, then the pressure driven transfer of water from the cathode reservoir to the anode reservoir will stop. When the water level in the anode reservoir falls below the lower opening 212 of the dip tube 204, the pressure within the anode system is reduced and the pressure driven water transfer from the cathode reservoir to the anode reservoir is reestablished.

The rest of the system 140 may remain unchanged from that of generator 10 of FIG. 1. Therefore, system 140 may include an anode recirculation pump 36, a power supply 70, a cooling system 66, and a standpipe 32 with a level equalizing hole 34 for natural circulation of the water during periods when the anode pump 36 is off and the water level falls below the top of the standpipe 32. The cooling system 64, 66, 68 may be operated by an electrical or mechanical temperature controller 106 and a temperature sensor 35 in direct communication with the condenser system and the body to be temperature regulated, shown as the anode reservoir water in FIGS. 1 and 2 but which body may be the anode end plate or any other location representative of the electrolyzer temperature. The power supply unit 70 may also operate in an autonomous mode with self-control of the power output to match ozone demand.

Electrolytic Cells

Ozone gas is preferably generated by an electrolytic method which offers both process and cost benefits. In the electrolytic method, ozone is generated by the electrolysis of water using a special electrolytic cell. Sources of electrical power and water are the only requirements for producing $O_3$ electrochemically. Unlike the ozone gas produced by the corona process, electrolytically generated ozone does not contain toxic by-products. The electrolytic reactions occur by applying DC power between the anode and cathode which are placed on either side of a proton-exchange membrane (PEM), preferably a perfluorinated sulfonic acid polymer membrane (such as NAFION 117 available from DuPont de Nemours, Wilmington, Del.). Water is fed to the anode catalyst where water oxidation takes place resulting in both the thermodynamically favored $O_2$ evolution reaction and the $O_3$ formation reaction.

Utilization of high overpotentials and certain electrode materials selectively enhance $O_3$ formation at the expense of $O_2$ evolution. The water oxidation reactions yield protons and electrons which are recombined at the cathode. Electrons are conducted to the cathode via the external circuit. The protons and electrons are recombined at the cathode in the presence of water to form hydrogen gas.

The use of a PEM instead of a liquid electrolyte offers several advantages. First, fluid management is simplified and the potential for leakage of corrosive liquids is eliminated. Second, the PEM/anode interface provides a chemical environment which is well-suited to the electrochemical $O_3$ reaction. A PEM based on a fluoropolymer, such as a perfluorinated sulfonic acid polymer, displays very high resistance to chemical attack.

Figure 3:
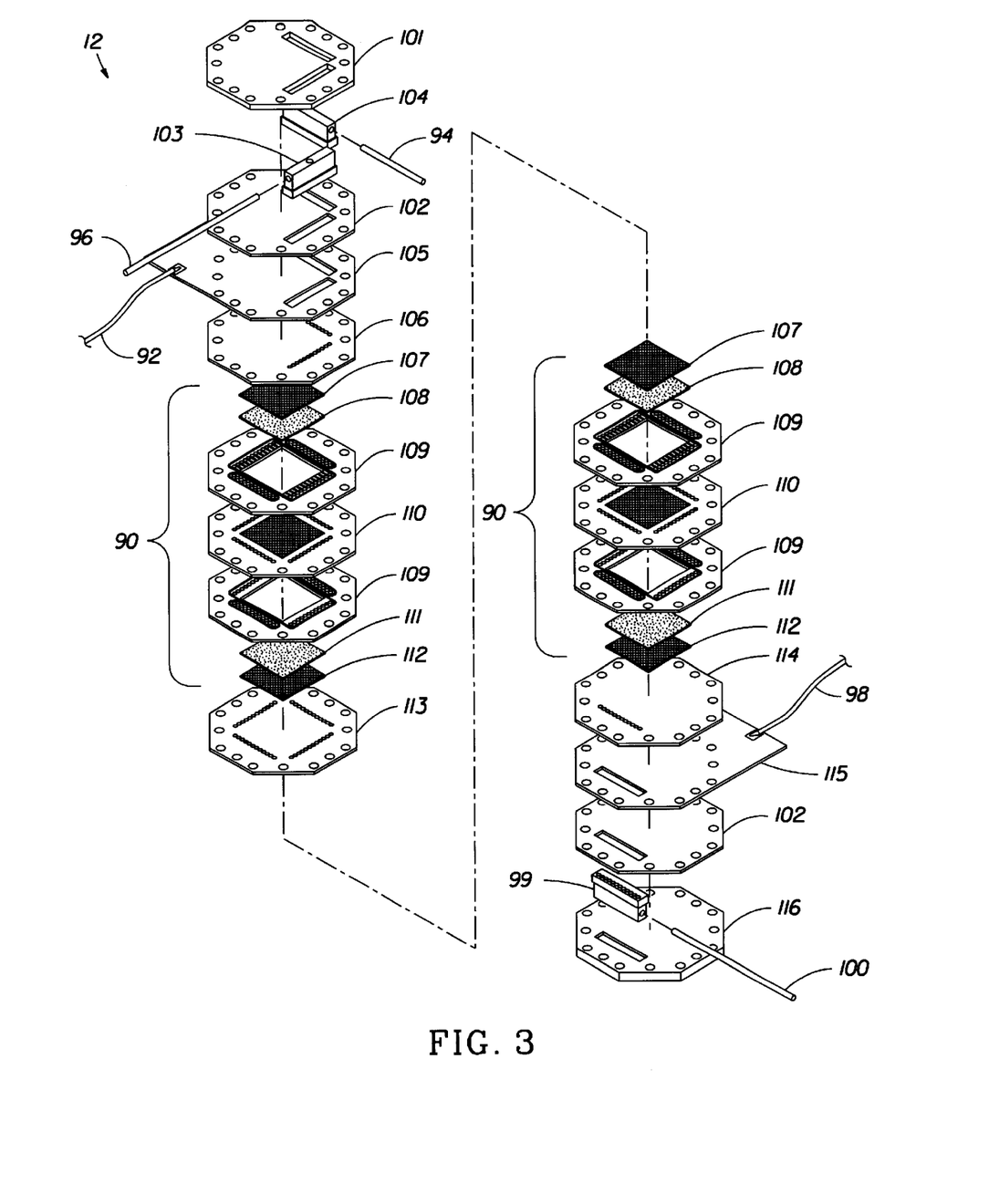
FIG. 3 is an exploded perspective view of an electrolytic cell for the production of ozone.

FIG. 3 is an exploded perspective view of the electrolytic cell stack 12 for the production of ozone. The cell stack 12 may include any number of individual cells, but is shown here with two cells 90 which are similar in construction and operation. Each cell 90 comprises an expanded titanium flowfield 107, a porous titanium member 108 having a lead dioxide catalyst deposited on its surface facing the PEM 110, and a cell frame 109 disposed around the flowfield 107 and member 108. The PEM 110 may be either coated with a cathodic catalyst, such as platinum, facing the porous stainless steel sheet 111 or be placed in contact with a carbon fiber paper (not shown) that has the cathodic catalyst formed thereon. A porous stainless steel sheet 111 is placed against the cathodic catalyst surface, followed by a rolled, expanded stainless steel flowfield 112 which may include a plurality of sheets. Another cell frame 109 is disposed around the sheet 111 and flowfield 112. A bipolar plate 113 is disposed between the two cells 90 to allow electronic conduction between the adjacent stainless steel flowfield 112 and the adjacent titanium flowfield 107.

The positive terminal of the cell stack 12 (shown at the top of FIG. 3) includes a current collector face plate 106 and a current collector 105 which is coupled to a cable 92 attached to the positive terminal of the power converter 72 (shown in FIG. 1). An insulator plate 102 is disposed against the current collector 105 to isolate the end plate 101, the water recycle bushing 104, which delivers water from the anode reservoir 30 through the tubing 94 to the anode compartment, and the hydrogen/water bushing 103, which communicates water and hydrogen from the cathode through tubing 96 to the cathode reservoir 40.

The negative terminal of the cell stack 12 (shown at the bottom of FIG. 3) includes a current collector face plate 114 and a current collector 115 which is coupled to a cable 98 attached to the negative terminal of the power converter 72 (shown in FIG. 1). An insulator plate 102 is disposed against the current collector 115 to isolate the end plate 116 and the water/oxygen/ozone bushing 99, which delivers water, oxygen and ozone from the anode compartment through the tubing 100 to the anode reservoir 30. The current collector 115 is therefore cooled by the anode water passing through the cell stack 12. The primary heat dissipating components of the power supply are preferably in thermal contact with the cooled current collector 115.

The two endplates 101, 116 are drawn together to compress all the components of the electrolytic cell stack 12 into a filter press type arrangement in which adjacent components are in intimate contact. The cell frames 109, membranes 110, bipolar plate 113, the current collector face plate 106, and the like are sufficiently compressed to provide a sealing engagement and collectively form manifolds for the delivery and withdrawal of fluids in the cell stack 12.

Figure 4:
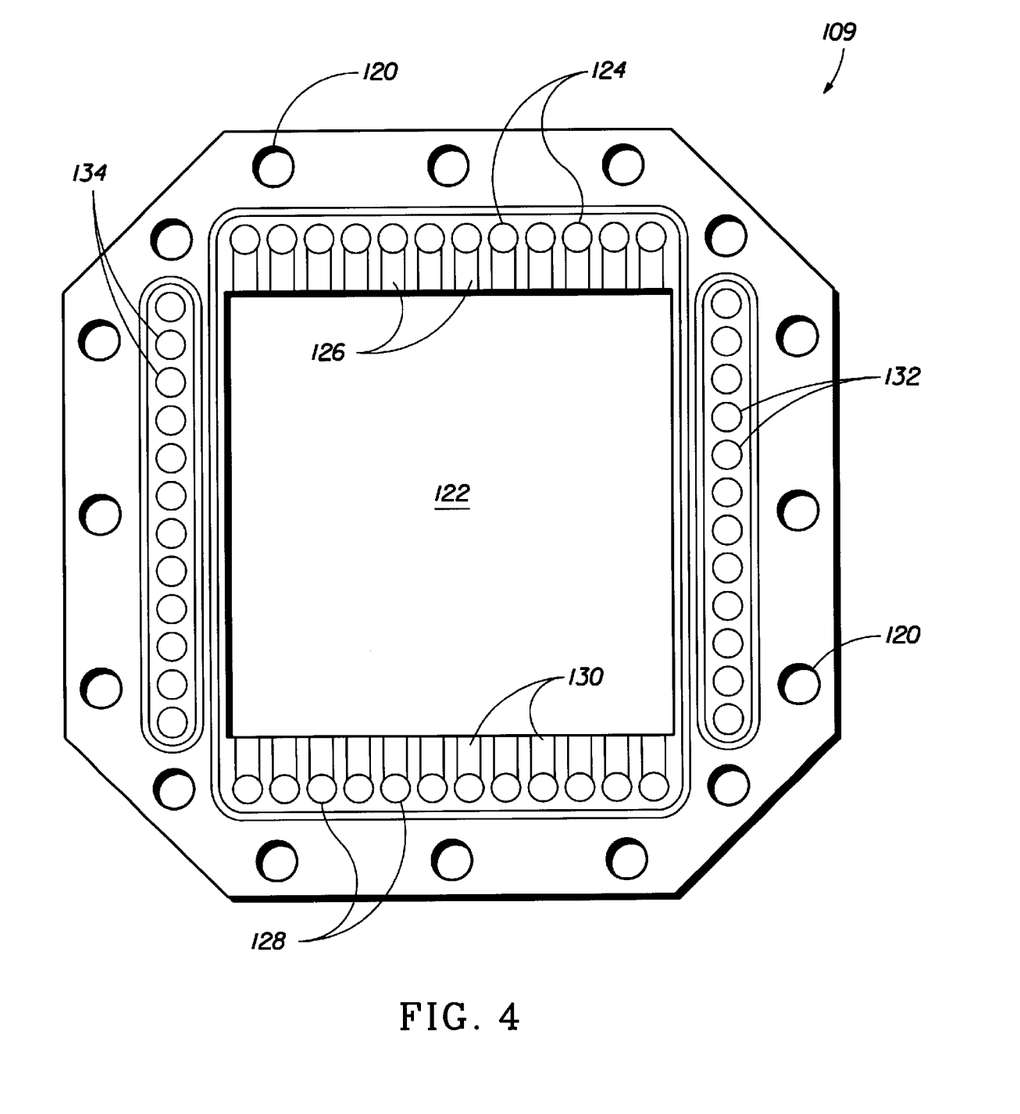
FIG. 4 is a front view of a cell frame suitable for use in the electrolytic cell of FIG. 2.

FIG. 4 is a front view of the cell frame 109 suitable for use in the electrolytic cell of FIG. 3. The cell frame 109 has a plurality of bolt holes 120 around its perimeter edge for aligning and securing the cell frame in place with adjacent membranes 110, bipolar plates 113 or current collector face plates 106. The cell frame 109 has a center region 122 that is open to receive a flowfield and electrode, such as the expanded titanium flowfield 107, the porous titanium sheet 108 and the electrocatalyst formed on the sheet 108. A first manifold is provided by the row of holes 124 which may, for example, supply water to the center region 122 through the slots 126. The water flowing through the center region 122 is then preferably collected in the opposing manifold, which is comprised of the holes 128 and slots 130, and withdrawn from the cell stack. It should be recognized that the holes 124,128 in both manifolds are lined up with and communicate with similar holes through adjacent components of the cell stack 12 (See FIG. 3). In the example just given, the water is delivered through holes 124 and slots 126 and passed through the titanium flowfield 107 and the porous titanium sheet 108 to the electrocatalyst where oxygen and ozone are produced. The ozone containing water is withdrawn through the slots 130 and holes 128 out of the cell stack to the anode reservoir. Conversely, the manifold formed by holes 132 and the manifold formed by holes 134 allow passage of fluids therethrough to another cell frame (not shown), such as a cell frame around a stainless steel flowfield 112 and a porous stainless steel sheet 111.

EXAMPLE

An ozone generator was designed in accordance with FIGS. 1, 3 and 4 to produce about 5 pounds per day of ozone from about 5 gallons per day of deionized water. A stack of 10 electrolytic cells were used to generate a continuous output of about 7 liters/minute of a wet oxygen stream having about 15 wt % of ozone. Each cell had an active area of about 100 square centimeters. The anode flowfield was provided by three rolled, expanded sheets of titanium and a layer of sintered titanium in electrical contact with the expanded titanium. The sintered titanium layer had a thin layer of a lead dioxide catalyst deposited onto its surface and the lead dioxide was placed in face-to-face contact with a proton exchange membrane (PEM). The PEM was a sheet of perfluorinated sulfonic acid polymer, NAFION 117. The cathodic electrocatalyst was provided by a carbon fiber paper impregnated with a platinum catalyst. The fiber paper was placed against the second side of the PEM. The cathode flowfield was then assembled adjacent the carbon fiber paper and included a sheet of compressible, stainless steel felt, a perforated stainless steel sheet, and three sheets of rolled, expanded stainless steel where the diamond shaped openings of the three sheets were oriented 90 degrees from each adjacent sheet.

The anode reservoir and cathode reservoir were made from cylinders of borosilicate glass (PYREX® glass available from Corning Glass Works, Corning, N.Y.) bolted between two stainless steel endplates that were machined to receive the cylinders and communicate with various tubes and devices. The clear cylinder allowed visual inspection of the liquid/gas separation processes carried out therein. Each reservoir was oriented vertically and had a volume of about 2 gallons. The anode water was cooled with about 70 feet of ½ inch diameter tubing disposed in the anode reservoir. The tubing was coupled to a condenser unit rated at 26,900 BTU at 100° F. ambient and 35° F. suction temperature (such as a model F 3AD-A325, available from Copeland of Sidney, Ohio). The power source recieved up to 70 amps of 208 volt three-phase current to power the various componets. The power converter was a six pulse, midpoint converter consisting of six thyristors (model 110RK180, available from International Rectifier of El Segundo, Calif.). The system controller provide the thyristors with a phase angle which allowed for an increase or decrease of the power output.

While the foregoing is directed to the preferred embodiment of the present invention, other and further embodiments of the invention may be devised without departing from the basic scope thereof, and the scope thereof is determined by the claims which follow.

What is claimed is:

1. An electrolyzer comprising:
    (a) one or more electrolytic cells, each electrolytic cell comprising an anode catalyst, a cathode catalyst, an ion exchange membrane in intimate contact between the anode catalyst and the cathode catalyst, an anode flow field, and a cathode flowfield;
    (b) wherein the anode flow field comprises:
        (1) a rolled, expanded metal sheet having a first side in contact with a first metal sheet bipolar plate or an anode current collector; and
        (2) a porous metal substrate having a first side in contact with a second side of the rolled, expanded metal sheet and a second side having the anode catalyst deposited thereon; and
    (c) wherein the cathode flow field comprises:
        (1) a rolled, expanded metal sheet having a first side in contact with a second metal sheet bipolar plate or a cathode current collector;
        (2) a rigid, perforated stainless steel sheet, wherein a first side of the sheet is in contact with a second side of the rolled, expanded metal sheet; and
        (3) a sheet of compressible stainless steel felt or wool having a first side in contact with a second side of the rigid, perforated stainless steel sheet and a second side in face-to-face contact with the cathode catalyst.

2. The electrolyzer of claim 1, wherein the anode catalyst comprises lead dioxide.

3. The electrolyzer of claim 1, wherein the cathode catalyst is coated onto the ion exchange membrane.

4. The electrolyzer of claim 1, wherein the cathode catalyst is impregnated onto a carbon fiber paper.

5. The electrolyzer of claim 4, where the cathode catalyst comprises platinum.

6. The electrolyzer of claim 1, further comprising:
    (d) an anode cell frame disposed around the anode flow field; and
    (e) a cathode cell frame disposed around the cathode flow field.

7. The electrolyzer of claim 6, wherein the anode cell frame comprises:

a plurality of bolt holes around its perimeter edge;

a center region that is open to receive an anode flow field;

a first manifold in the cell frame comprising a plurality of holes in a row in fluid communication one-to-one with a plurality of slots on the first side of the cell frame for fluid delivery to, or withdrawal from, the center region of the cell frame;

an opposing manifold in the cell frame comprising a plurality of holes in a row in fluid communication one-to-one with a plurality of slots on the first side of the cell frame for fluid delivery to, or withdrawal from, the center region of the cell frame;

a second manifold, oriented at right angles to the first manifold, comprising a plurality of holes in a row, for fluid delivery to, or withdrawal from, the center region of a cathode cell frame;

an opposing manifold, oriented at right angles to the first manifold, comprising a plurality of holes in a row, for fluid delivery to, or withdrawal from, the center region of a cathode cell frame;

one or more o-rings around the first and second manifolds and their opposing manifolds;

wherein the anode cell frame is characterized in that the holes in the first and second manifolds, and their opposing manifolds, line up with, and are in fluid communication with, similar holes through adjacent components in the electrolyzer.

8. The electrolyzer of claim 1, wherein the anode flow field comprises a stack of two or more rolled, expanded metal sheets, each sheet having elongated openings oriented about 90 degrees from the elongated openings of each adjacent sheet, wherein a first side of the stack of rolled, expanded metal sheets is in contact with a first metal sheet bipolar plate or an anode current collector.

9. The electrolyzer of claim 1, wherein the cathode flow field comprises a stack of two or more rolled, expanded metal sheets, each sheet having elongated openings oriented about 90 degrees from the elongated openings of each adjacent sheet, wherein a first side of the stack of rolled, expanded metal sheets is in contact with a second metal sheet bipolar plate or a cathode current collector.

10. The electrolyzer of claim 1, wherein the one or more electrolytic cells form an electrolytic cell stack.

11. The electrolyzer of claim 1, wherein the one or more electrolytic cells are electrically in series and fluidically in parallel.

12. The electrolyzer of claim 1, further comprising a metal bipolar plate disposed between each pair of adjacent cells;

a positive terminal comprising a positive end plate, a current collector face plate, and a current collector coupled to a cable attached on the other end of the cable to the positive terminal of a power supply;

an insulator plate disposed between the current collector and the positive end plate;

a first water bushing and a second hydrogen gas/water bushing attached to the positive end plate;

a negative terminal comprising a negative end plate, a current collector face plate, and a current collector coupled to a cable attached on the other end of the cable to the negative terminal of the power supply;

an insulator plate disposed between the current collector and the negative end plate; and a third oxygen and ozone gases/water bushing attached to the negative end plate.

13. The electrolyzer of claim 12, wherein the positive and negative end plates are drawn together to compress all the components of the electrolyzer into a filter press-type arrangement in which adjacent components are in intimate contact.

14. The electrolyzer of claim 13, wherein the components of the one or more electrolytic cells are sufficiently compressed to provide a sealing engagement and collectively form manifolds for the delivery and withdrawal of fluids in the cell stack.

15. The electrolyzer of claim 12, wherein the power supply has primary heat dissipating components in thermal contact with the current collector.

16. The electrolyzer of claim 1, wherein the anode flow field comprises a valve metal.

17. The electrolyzer of claim 16, wherein the anode flow field comprises titanium.

18. The electrolyzer of claim 1, wherein the cathode flow field comprises stainless steel, nickel, copper, or combinations thereof.

19. The electrolyzer of claim 1, wherein the metal sheet bipolar plate comprises a valve metal.

20. The electrolyzer of claim 19, wherein the metal sheet bipolar plate comprises titanium.

21. The electrolyzer of claim 1, wherein the porous metal anode substrate comprises a valve metal.

22. The electrolyzer of claim 21, wherein the porous metal anode substrate comprises titanium.

23. The electrolyzer of claim 1, wherein the anode flow field and cathode flow field comprise:

a first region adjacent the ion exchange membrane that is flat, smooth, and porous, wherein the first region provides substantially continuous and even support of the ion exchange membrane and electrocatalysts; and a second region that is more open providing a low-resistance fluid flow path therethrough.

24. The electrolyzer of claim 1, wherein the preferred rigid, perforated stainless steel sheet has holes therethrough which are larger than the passages in the stainless steel felt and smaller than the openings in the expanded stainless steel.

25. The electrolyzer of claim 1, further comprising:

a main power supply unit and a power converter for converting AC current to DC current and delivering current to the electrolyzer cells;

a battery backup to the main power supply, wherein the battery is preferably continuously charged by a battery charger; and wherein the main power supply and the battery charger are directly connected to an external source of AC electrical power.

26. The electrolyzer of claim 25, wherein the backup battery is connected to the electrolyzer in parallel with the main power supply through a forward biased diode.

27. The electrolyzer of claim 1, wherein the cathode cell frame comprises:

a plurality of bolt holes around its perimeter edge;

a center region that is open to receive a cathode flow field;

a first manifold in the cell frame comprising a plurality of holes in a row in fluid communication one-to-one with a plurality of slots on the first side of the cell frame for fluid delivery to, or withdrawal from, the center region of the cell frame;

an opposing manifold in the cell frame comprising a plurality of holes in a row in fluid communication one-to-one with a plurality of slots on the first side of the cell frame for fluid delivery to, or withdrawal from, the center region of the cell frame;

a second manifold, oriented at right angles to the first manifold, comprising a plurality of holes in a row, for fluid delivery to, or withdrawal from, the center region of a anode cell frame;

an opposing manifold, oriented at right angles to the first manifold, comprising a plurality of holes in a row, for fluid delivery to, or withdrawal from, the center region of a anode cell frame;

one or more o-rings around the first and second manifolds and their opposing manifolds;

wherein the cathode cell frame is characterized in that the holes in the first and second manifolds, and their opposing manifolds, line up with, and are in fluid communication with, similar holes through adjacent components in the electrolyzer.

* * * * *